US012771982B2

(12) United States Patent
Wu et al.

(10) Patent No.: US 12,771,982 B2
(45) Date of Patent: Oct. 20, 2026

(54) DETECTION DEVICE AND DETECTION METHOD

(71) Applicant: HTC Corporation, Taoyuan City (TW)

(72) Inventors: Chun-Yih Wu, Taoyuan City (TW); Ta-Chun Pu, Taoyuan City (TW); Chien-Chih Chen, Taoyuan City (TW); Yen-Liang Kuo, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 196 days.

(21) Appl. No.: 18/941,049

(22) Filed: Nov. 8, 2024

(65) Prior Publication Data

US 2026/0136125 A1 May 14, 2026

(51) Int. Cl.
*H04R 1/10* (2026.01)
*G01B 9/02* (2022.01)

(52) U.S. Cl.
CPC ....... *H04R 1/1041* (2013.01); *G01B 9/02092* (2013.01); *H04R 1/1016* (2013.01)

(58) Field of Classification Search
CPC ........ H04B 10/40; H04B 13/005; H04B 1/40; H04B 1/385; H04B 2001/3866; H04B 10/502; H04R 1/1041; H04R 1/1016; G01B 9/02092; G01J 1/44; G01J 2001/446; G02B 6/12004
See application file for complete search history.

(56) References Cited

U.S. PATENT DOCUMENTS

| | | | | |
|---|---|---|---|---|
| 11,243,686 B2 | 2/2022 | McCord | | |
| 2005/0209516 A1* | 9/2005 | Fraden | A61B 5/14552 | 600/323 |
| 2014/0072146 A1* | 3/2014 | Itkin | H04R 23/008 | 381/111 |
| 2017/0181708 A1* | 6/2017 | Orron | A61B 5/6843 | |
| 2022/0099431 A1 | 3/2022 | Chen et al. | | |

FOREIGN PATENT DOCUMENTS

| | | | | |
|---|---|---|---|---|
| CN | 105379306 A | 3/2016 | | |
| CN | 107077616 A * | 8/2017 | G06V 40/1329 | |

* cited by examiner

*Primary Examiner* — Carolyn R Edwards
*Assistant Examiner* — Julie X Dang
(74) *Attorney, Agent, or Firm* — Birch, Stewart, Kolasch & Birch, LLP

(57) ABSTRACT

A detection device includes a sound generator, an optical transmitter, a compound waveguide, an optical receiver, a processor, and a housing element. The sound generator generates a sound signal. The optical transmitter generates an incident light signal. The compound waveguide transmits the sound signal and the incident light signal to a human body portion. Thus, the human body portion transmits a reflected light signal back to the compound waveguide. The compound waveguide further generates a mixed light signal according to the incident light signal and the reflected light signal. The optical receiver receives the mixed light signal. The processor is coupled to the optical receiver. The processor obtains the physiological information of the human body portion according to the mixed light signal. The sound generator, the optical transmitter, the compound waveguide, the optical receiver, and the processor are disposed inside the housing element.

20 Claims, 3 Drawing Sheets

DETECTION DEVICE AND DETECTION METHOD

BACKGROUND OF THE INVENTION

Field of the Invention

The invention relates in general to a detection device, and more particularly, it relates to a detection device and a detection method thereof.

Description of the Related Art

Physiological signal detection devices are commonly used detection components. However, when being applied in the field of VR (Virtual Reality) or AR (Augmented Reality), the detection accuracy of a conventional physiological signal detection device is usually not high enough. Accordingly, there is a need to propose a novel solution for solving the problem of the prior art.

BRIEF SUMMARY OF THE INVENTION

In an exemplary embodiment, the invention is directed to a detection device for detecting a human body portion. The detection device includes a sound generator, an optical transmitter, a compound waveguide, an optical receiver, a processor, and a housing element. The sound generator generates a sound signal. The optical transmitter generates an incident light signal. The compound waveguide transmits the sound signal and the incident light signal to the human body portion. Thus, the human body portion transmits a reflected light signal back to the compound waveguide. The compound waveguide further generates a mixed light signal according to the incident light signal and the reflected light signal. The optical receiver receives the mixed light signal. The processor is coupled to the optical receiver. The processor obtains the physiological information of the human body portion according to the mixed light signal. The sound generator, the optical transmitter, the compound waveguide, the optical receiver, and the processor are all disposed inside the housing element.

In some embodiments, the detection device is a wearable device.

In some embodiments, the wearable device is a headphone device.

In some embodiments, the human body portion is an eardrum.

In some embodiments, the incident light signal, the reflected light signal, and the mixed light signal are IR (Infrared) signals.

In some embodiments, the compound waveguide includes a sound waveguide and a light waveguide.

In some embodiments, the light waveguide is surrounded by the sound waveguide.

In some embodiments, in the compound waveguide, a self-mixing effect is induced between the incident light signal and the reflected light signal, so as to form the mixed light signal.

In some embodiments, the detection device further includes a converter coupled between the optical receiver and the processor. The converter outputs a main signal to the processor according to the mixed light signal.

In some embodiments, the housing element is a headphone housing.

In some embodiments, the optical transmitter uses a side transmitting mechanism.

In some embodiments, the optical receiver uses a side receiving mechanism.

In another exemplary embodiment, the invention is directed to a detection method that includes the steps of: generating a sound signal; generating an incident light signal; transmitting the sound signal and the incident light signal to a human body portion by a compound waveguide, such that the human body portion transmits a reflected light signal back to the compound waveguide; generating a mixed light signal by the compound waveguide according to the incident light signal and the reflected light signal; receiving the mixed light signal; and obtaining physiological information of the human body portion according to the mixed light signal.

In some embodiments, the detection method further includes: outputting a main signal by a converter according to the mixed light signal.

In some embodiments, the detection method further includes: using a side transmitting mechanism to transmit the incident light signal; and using a side receiving mechanism to receive the mixed light signal.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
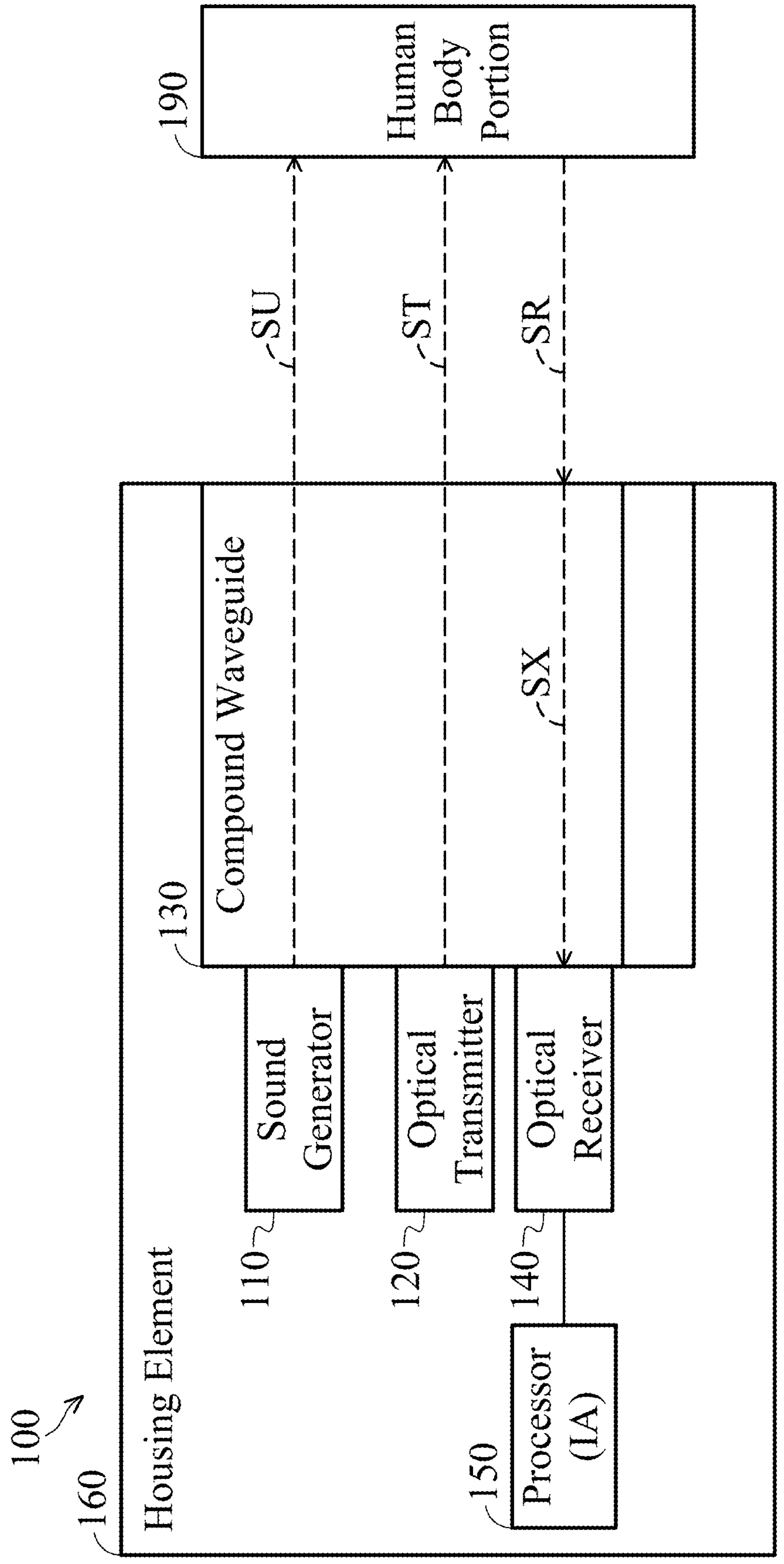
FIG. 1 is a diagram of a detection device according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a detection device 100 according to an embodiment of the invention. For example, the detection device 100 may be a wearable device, which may be applied to the field of VR (Virtual Reality) or AR (Augmented Reality), but it is not limited thereto. In the embodiment of FIG. 1, the detection device 100 includes a sound generator 110, an optical transmitter 120, a compound waveguide 130, an optical receiver 140, a processor 150, and a housing element 160. It should be understood that the detection device 100 may further include other components, such as a display device, a speaker, a power supply module and/or a housing, although they are not displayed in FIG. 1.

In some embodiments, the detection device 100 is configured to detect a human body portion 190. For example, the human body portion 190 may be an ear of a user, but it is not limited thereto.

The sound generator 110 generates a sound signal SU. For example, the sound generator 110 may be implemented with a speaker or a sound amplifier, but it is not limited thereto.

The optical transmitter 120 generates an incident light signal ST. In some embodiments, the sound generator 110, the optical transmitter 120, and the optical receiver 140 are all disposed adjacent to the compound waveguide 130. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0).

For example, the compound waveguide 130 may be made of two or more different materials. The compound waveguide 130 transmits the sound signal SU and the incident light signal ST to the human body portion 190, such that the human body portion 190 transmits a reflected light signal SR back to the compound waveguide 130. The compound waveguide 130 further generates a mixed light signal SX according to the incident light signal ST and the reflected light signal SR. For some embodiments, in the compound waveguide 130, a self-mixing effect is induced between the incident light signal ST and the reflected light signal SR, so as to form the mixed light signal SX as mentioned above.

The optical receiver 140 receives the mixed light signal SX. In some embodiments, the optical transmitter 120 is an IR (Infrared) transmitter, and the optical receiver 140 is an IR receiver. The incident light signal ST, the reflected light signal SR, and the mixed light signal SX may all be IR signals.

The processor 150 is coupled to the optical receiver 140. The processor 150 can obtain the physiological information IA of the human body portion 190 according to the mixed light signal SX. In some embodiments, the detection device 100 uses an SMI (Self-Mixing Interferometry) mechanism to extract the physiological information IA from the human body portion 190, but it is not limited thereto.

The shape and type of the housing element 160 are not limited in the invention. For example, the housing element 160 may be made of a nonconductive material. In some embodiments, the sound generator 110, the optical transmitter 120, the compound waveguide 130, the optical receiver 140, and the processor 150 are all disposed inside the housing element 160.

Generally, the reflected light signal SR can record a variety of information relative to the human body portion 190. After the self-mixing effect is induced between the reflected light signal SR and the incident light signal ST, the compound waveguide 130 can provide the mixed light signal SX for the optical receiver 140 and the processor 150. Thus, the processor 150 can accurately estimate the physiological information IA of the human body portion 190 by analyzing the mixed light signal SX. For example, the aforementioned physiological information IA may include a heart rate, a blood pressure, a respiratory rate, a blood oxygen saturation, and/or a body temperature, but it is not limited thereto. With the design of the invention, the proposed detection device 100 can easily perform a non-invasive detection process on the human body portion 190, and the non-invasive detection process can provide sufficient detection accuracy.

The following embodiments will introduce different configurations and detail structural features of the detection device 100. It should be understood that these figures and descriptions are merely exemplary, rather than limitations of the invention.

Figure 2:
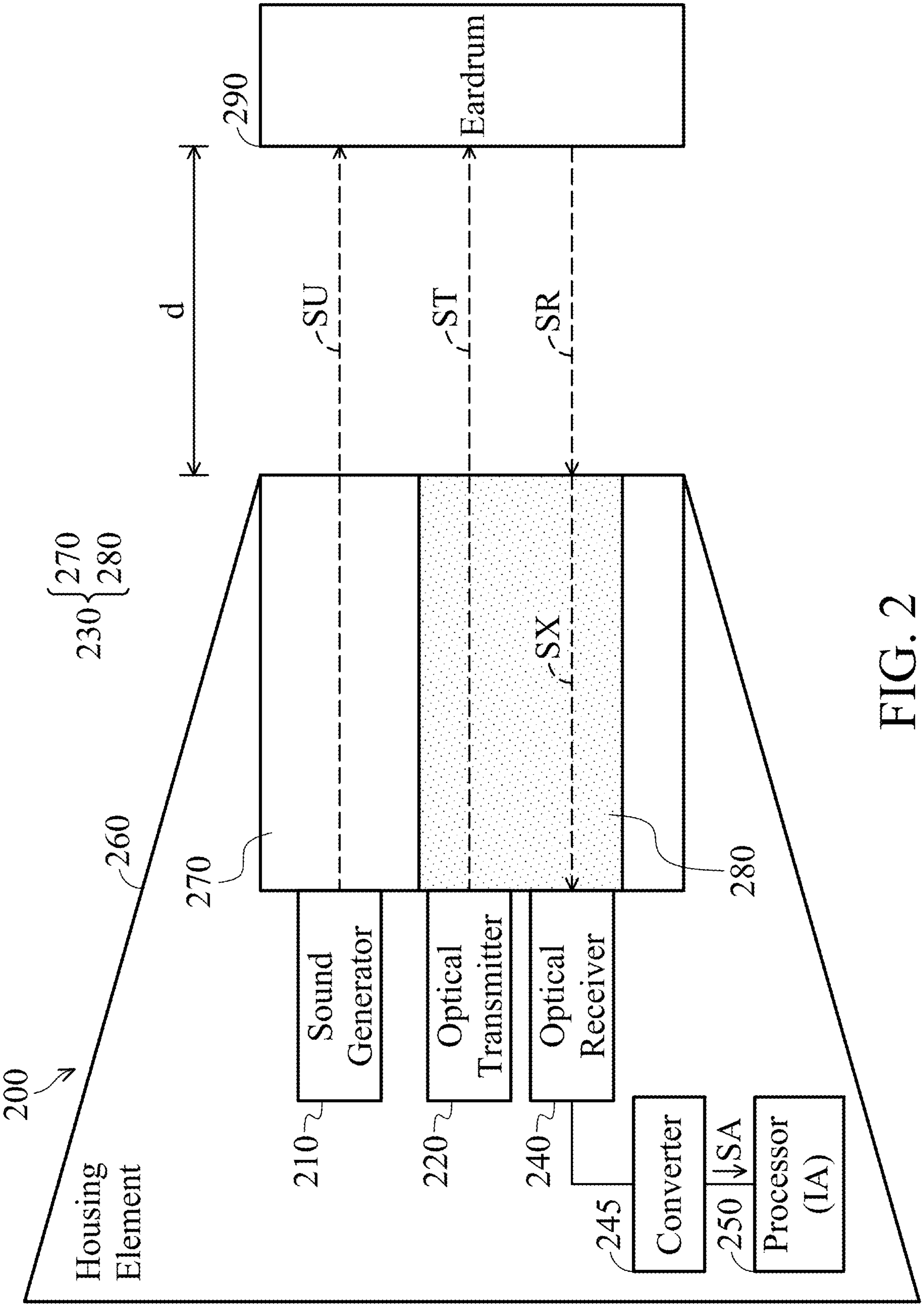
FIG. 2 is a diagram of a detection device according to an embodiment of the invention.

FIG. 2 is a diagram of a detection device 200 according to an embodiment of the invention. FIG. 2 is similar to FIG. 1. In the embodiment of FIG. 2, the detection device 200 is a headphone device, and the human body portion detected by the detection device 200 is an eardrum 290. As shown in FIG. 2, the detection device 200 includes a sound generator 210, an optical transmitter 220, a compound waveguide 230, an optical receiver 240, a converter 245, a processor 250, and a housing element 260.

The sound generator 210 generates a sound signal SU. The optical transmitter 220 generates an incident light signal ST. The compound waveguide 230 transmits the sound signal SU and the incident light signal ST to the eardrum 290, such that the eardrum 290 transmits a reflected light signal SR back to the compound waveguide 230. Specifically, the compound waveguide 230 includes a sound waveguide 270 and a light waveguide 280. The sound waveguide 270 is configured to transmit the sound signal SU. The light waveguide 280 is configured to transmit the incident light signal ST and the reflected light signal SR. For example, the light waveguide 280 may be surrounded by the sound waveguide 270. The sound waveguide 270 and the light waveguide 280 may be made of two different plastic materials. For some embodiments, in the light waveguide 280, a self-mixing effect is induced between the incident light signal ST and the reflected light signal SR, so as to form a mixed light signal SX.

The optical receiver 240 receives the mixed light signal SX. In some embodiments, the optical transmitter 220 uses a side transmitting mechanism, and the optical receiver 240 uses a side receiving mechanism, so as to improve the communication quality of both signal transmission and signal reception. The converter 245 is coupled between the optical receiver 240 and the processor 250. The converter 245 outputs a main signal SA to the processor 250 according to the mixed light signal SX. For example, the main signal SA may correspond to the main components of the mixed light signal SX. In some embodiments, the converter 245 is implemented with an ADC (Analog-to-Digital Converter). Then, the processor 250 can obtain the physiological information IA of the eardrum 290 according to the main signal SA. For example, the aforementioned physiological information IA may include a heart rate, a blood pressure, a respiratory rate, a blood oxygen saturation, a body temperature, a hearing health index, a stress level, and/or a brain wave, but it is not limited thereto.

The housing element 260 may be a headphone housing. The sound generator 210, the optical transmitter 220, the compound waveguide 230, the optical receiver 240, the converter 245, and the processor 250 may all be disposed inside the housing element 260. In some embodiments, the housing element 260 substantially has a tapered shape to fit a narrow ear canal of a user. For example, there may be a specific distance d between the compound waveguide 230 and the eardrum 290. According to practical measurements, the proposed detection device 200 can perform a non-invasive detection process on the eardrum 290, so as to accurately collect a variety of information relative to the user. Other features of the detection device 200 of FIG. 2 are similar to those of the detection device 100 of FIG. 1. Accordingly, the two embodiments can achieve similar levels of performance.

In some embodiments, the operational principles of the detection device 200 will be described according to the following equations (1) to (4):

$$X(t) = T(t) + R(t) \tag{1}$$

$$\Delta\theta(t) = \theta(t) - \theta\left(t - \frac{2d}{c}\right) \tag{2}$$

$$X(t) = M \cdot \cos\left[2\pi \mathrm{ft} - \frac{4\pi d}{\lambda} - \frac{4\pi R(t)}{\lambda} + \theta\left(t - \frac{2d}{c}\right)\right] \tag{3}$$

$$A(t) = \cos\left[\frac{4\pi d}{\lambda} + \frac{4\pi R(t)}{\lambda} + \Delta\theta(t)\right] \tag{4}$$

where "T(t)" represents the time function of the incident light signal ST, "R(t)" represents the time function of the reflected light signal SR, "X(t)" represents the time function of the mixed light signal SX, "A(t)" represents the time function of the main signal SA, "θ(t)" represents the time function of phase noise (e.g., the phase noise may result from the non-ideal characteristics of the oscillator of the optical transmitter 220), "Δθ(t)" represents the time function of the phase noise difference, "t" represents a time variable, "d" represents the specific distance d, "c" represents the speed of light, "π" represents the circumference ratio, "f" represents the frequency of the incident light signal ST, "λ" represents the wavelength of the incident light signal ST, and "M" represents the magnitude of the mixed light signal SX.

Figure 3:
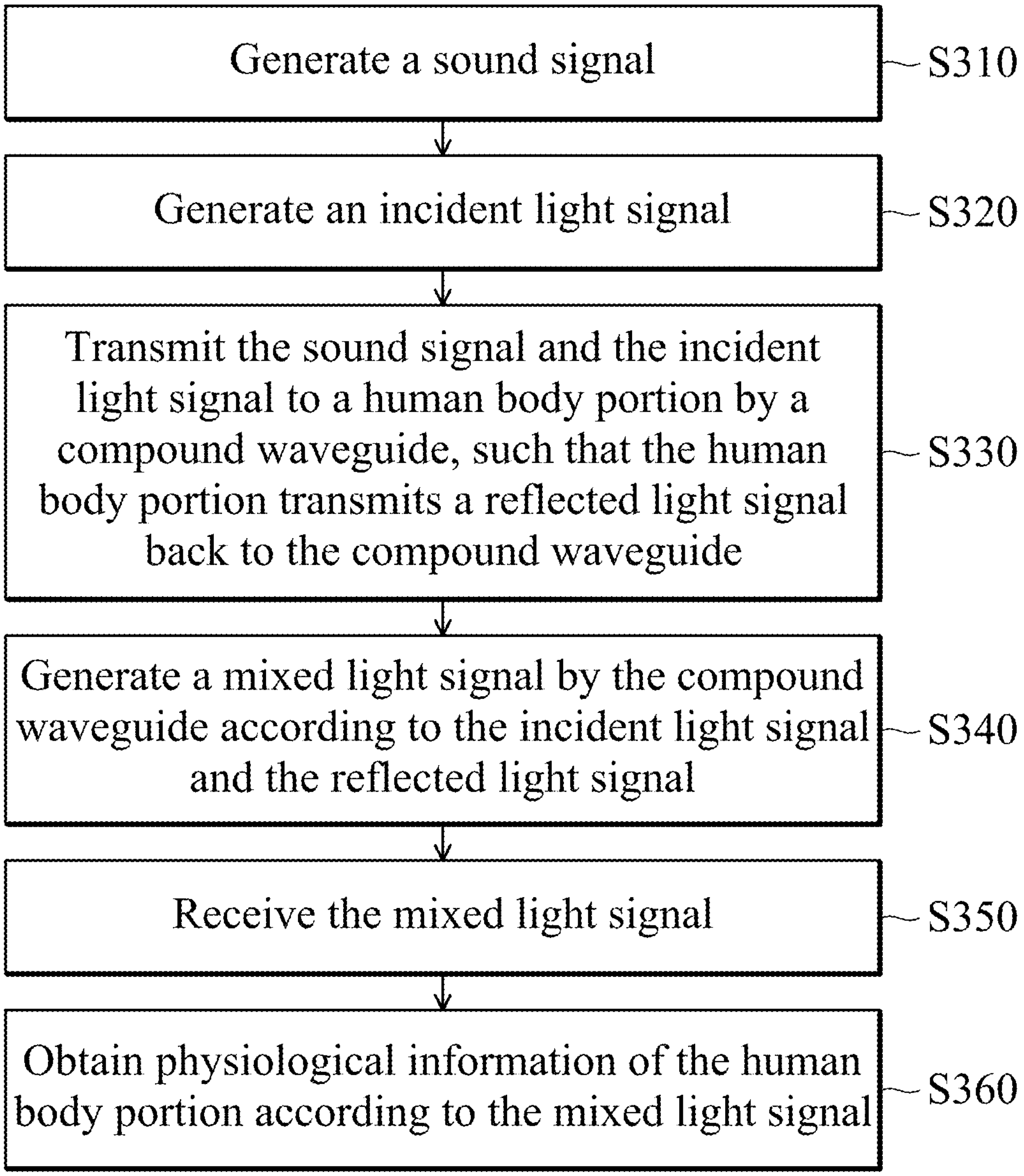
FIG. 3 is a flowchart of a detection method according to an embodiment of the invention.

FIG. 3 is a flowchart of a detection method according to an embodiment of the invention. To begin, in step S310, a sound signal is generated. In step S320, an incident light signal is generated. In step S330, the sound signal and the incident light signal are transmitted to a human body portion by a compound waveguide. Thus, the human body portion transmits a reflected light signal back to the compound waveguide. In step S340, a mixed light signal is generated by the compound waveguide according to the incident light signal and the reflected light signal. In step S350, the mixed light signal is received. Finally, in step S360, the physiological information of the human body portion is obtained according to the mixed light signal. It should be understood that these steps are not required to be performed in order, and every feature of the embodiments of FIGS. 1 and 2 may be applied to the detection method of FIG. 3.

The invention proposed a novel detection device and a novel detection method. In comparison to the conventional design, the invention has at least the advantages of using the non-invasive detection process and improving the overall detection accuracy. Therefore, the invention is suitable for application in a variety of devices.

Note that the above element parameters are not limitations of the invention. A designer can fine-tune these setting values according to different requirements. It should be understood that the detection device and the detection method of the invention are not limited to the configurations of FIGS. 1-3. The invention may include any one or more features of any one or more embodiments of FIGS. 1-3. In other words, not all of the features displayed in the figures should be implemented in the detection device and the detection method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A detection device for detecting a human body portion, comprising:

a sound generator, generating a sound signal;

an optical transmitter, generating an incident light signal;

a compound waveguide, transmitting the sound signal and the incident light signal to the human body portion, such that the human body portion transmits a reflected light signal back to the compound waveguide, wherein the compound waveguide generates a mixed light signal according to the incident light signal and the reflected light signal;

an optical receiver, receiving the mixed light signal;

a processor, coupled to the optical receiver, wherein the processor obtains physiological information of the human body portion according to the mixed light signal; and a housing element, wherein the sound generator, the optical transmitter, the compound waveguide, the optical receiver, and the processor are disposed inside the housing element.

2. The detection device as claimed in claim 1, wherein the detection device is a wearable device.

3. The detection device as claimed in claim 2, wherein the wearable device is a headphone device.

4. The detection device as claimed in claim 1, wherein the human body portion is an eardrum.

5. The detection device as claimed in claim 1, wherein the incident light signal, the reflected light signal, and the mixed light signal are IR (Infrared) signals.

6. The detection device as claimed in claim 1, wherein the compound waveguide comprises a sound waveguide and a light waveguide.

7. The detection device as claimed in claim 6, wherein the light waveguide is surrounded by the sound waveguide.

8. The detection device as claimed in claim 1, wherein in the compound waveguide, a self-mixing effect is induced between the incident light signal and the reflected light signal, so as to form the mixed light signal.

9. The detection device as claimed in claim 1, further comprising:

a converter, coupled between the optical receiver and the processor, wherein the converter outputs a main signal to the processor according to the mixed light signal.

10. The detection device as claimed in claim 1, wherein the housing element is a headphone housing.

11. The detection device as claimed in claim 1, wherein the optical transmitter uses a side transmitting mechanism.

12. The detection device as claimed in claim 1, wherein the optical receiver uses a side receiving mechanism.

13. A detection method, comprising the steps of:

generating a sound signal;

generating an incident light signal;

transmitting the sound signal and the incident light signal to a human body portion by a compound waveguide, such that the human body portion transmits a reflected light signal back to the compound waveguide;

generating a mixed light signal by the compound waveguide according to the incident light signal and the reflected light signal;

receiving the mixed light signal; and obtaining physiological information of the human body portion according to the mixed light signal.

14. The detection method as claimed in claim 13, wherein the human body portion is an eardrum.

15. The detection method as claimed in claim 13, wherein the incident light signal, the reflected light signal, and the mixed light signal are IR (Infrared) signals.

16. The detection method as claimed in claim 13, wherein the compound waveguide comprises a sound waveguide and a light waveguide.

17. The detection method as claimed in claim 16, wherein the light waveguide is surrounded by the sound waveguide.

18. The detection method as claimed in claim 13, wherein in the compound waveguide, a self-mixing effect is induced between the incident light signal and the reflected light signal, so as to form the mixed light signal.

19. The detection method as claimed in claim 13, further comprising:

outputting a main signal by a converter according to the mixed light signal.

20. The detection method as claimed in claim 13, further comprising:

using a side transmitting mechanism to transmit the incident light signal; and using a side receiving mechanism to receive the mixed light signal.

* * * * *